Sept. 10, 1946. N. H. YOUNG, JR 2,407,336
METHOD AND MEANS FOR TRANSMITTING INTELLIGENCE
Filed Nov. 1, 1943 5 Sheets-Sheet 1

INVENTOR.
NORMAN H. YOUNG, JR.
BY
ATTORNEY

Sept. 10, 1946. N. H. YOUNG, JR 2,407,336
METHOD AND MEANS FOR TRANSMITTING INTELLIGENCE
Filed Nov. 1, 1943 5 Sheets-Sheet 2
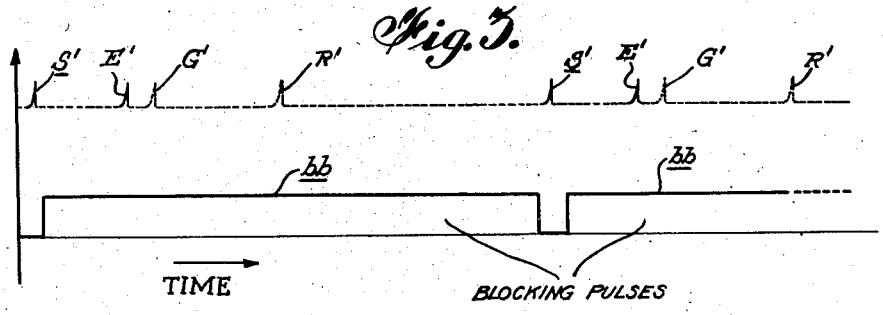
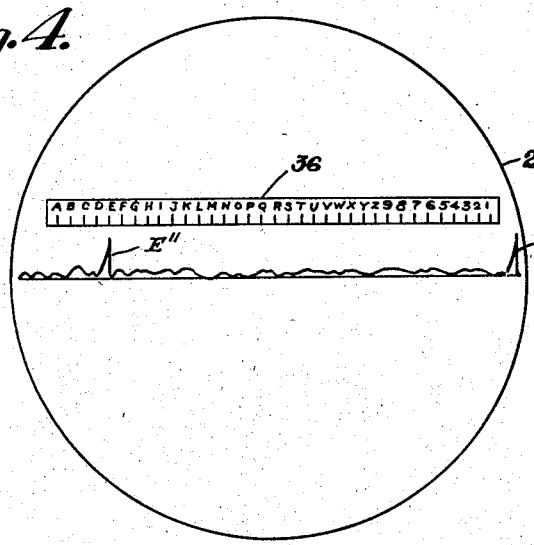
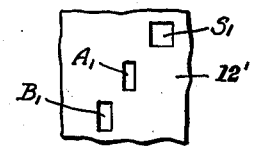
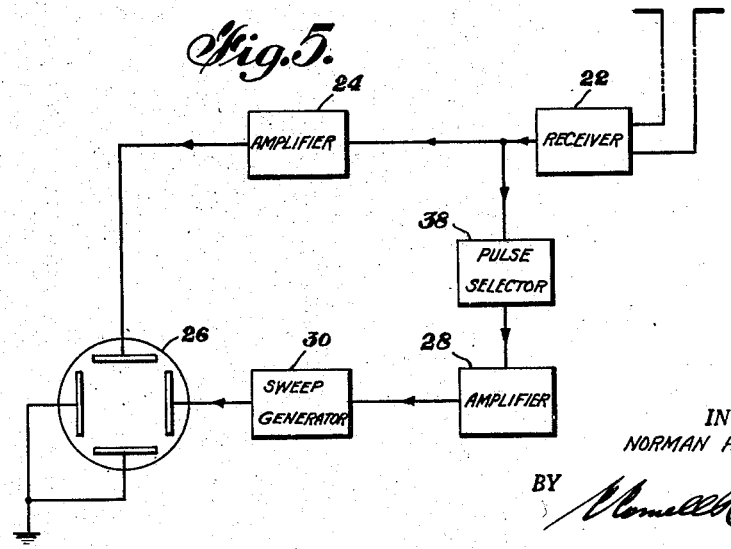
INVENTOR.
NORMAN H. YOUNG, JR.
BY
ATTORNEY

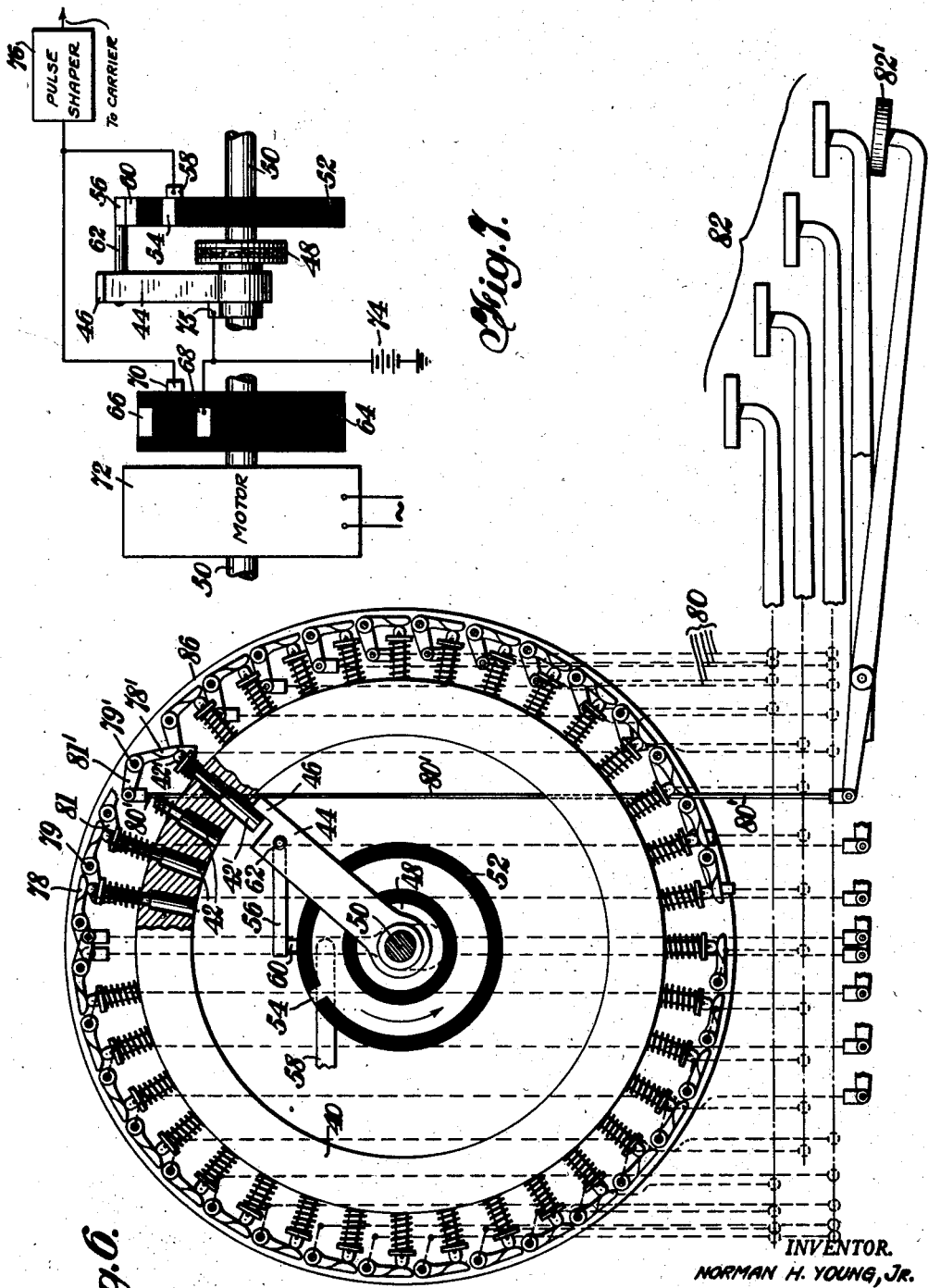

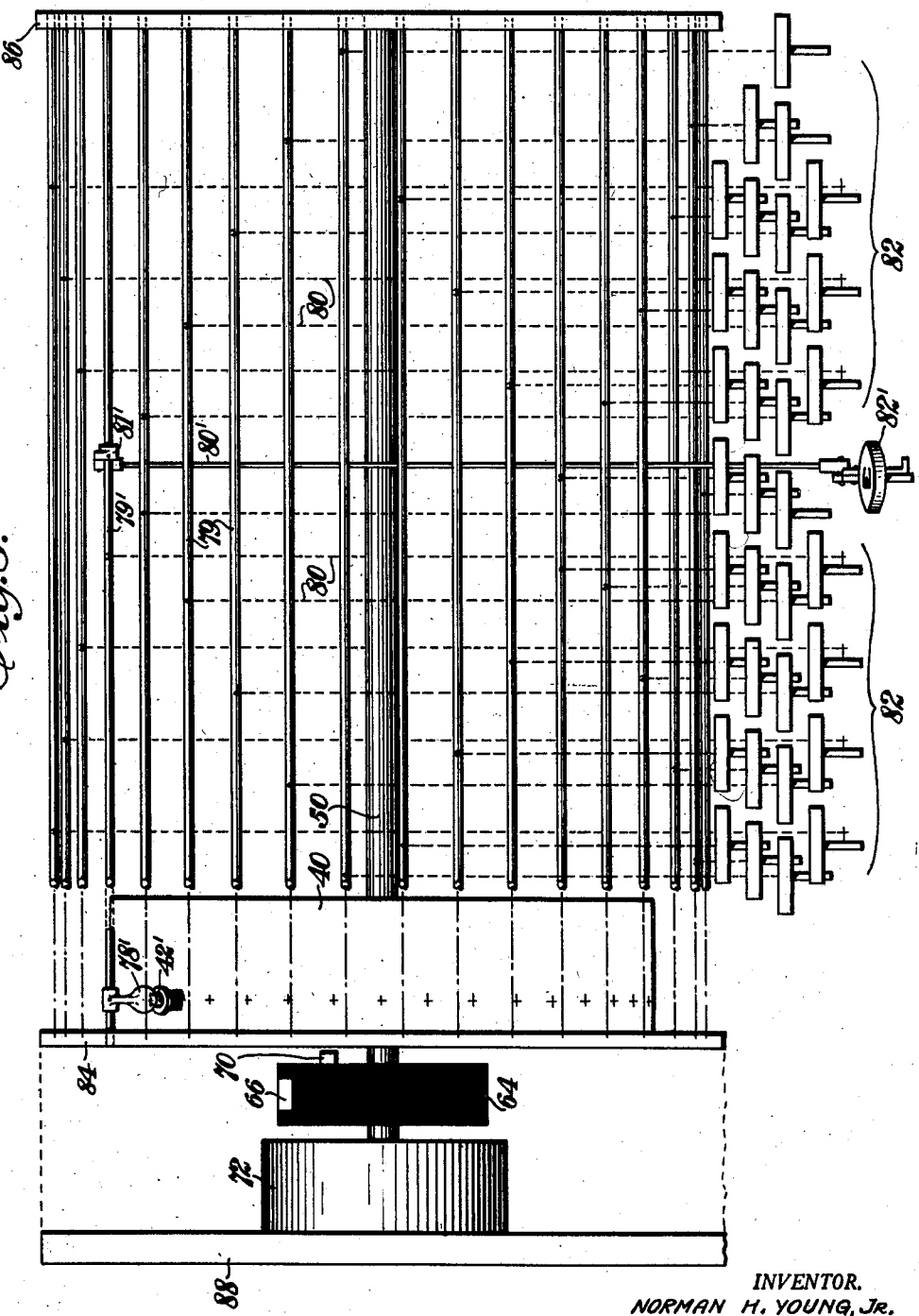

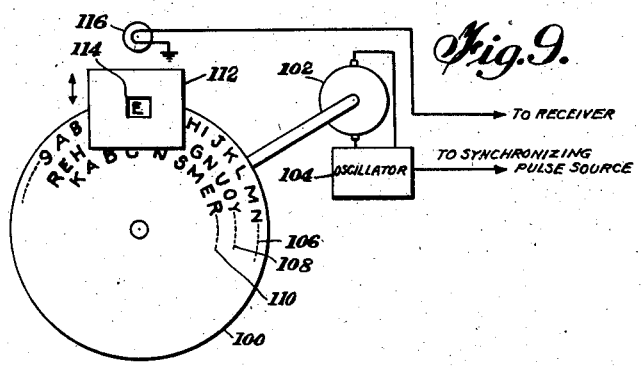
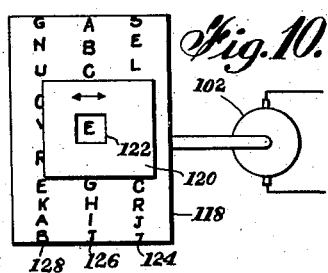
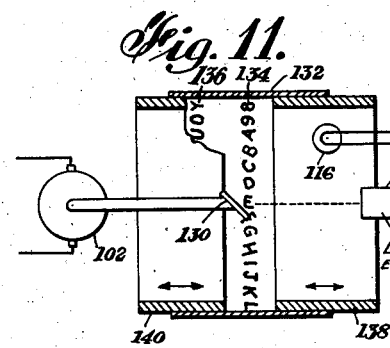
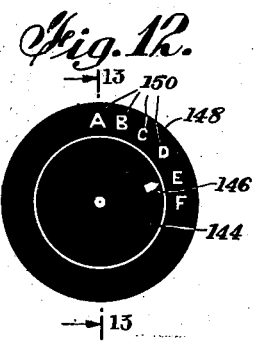
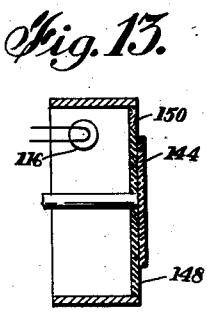
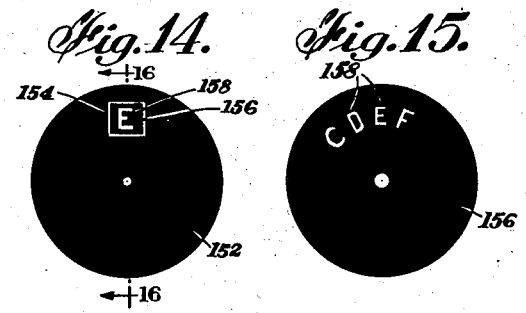
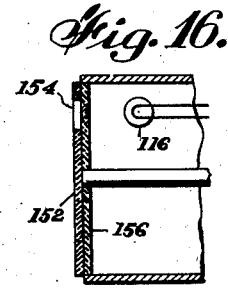
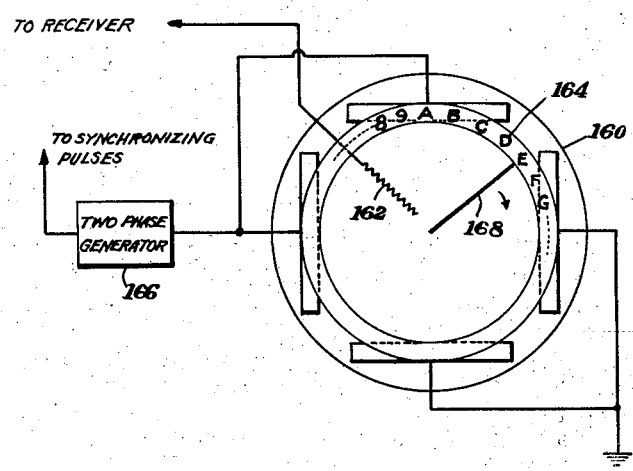
INVENTOR.
NORMAN H. YOUNG, JR.

Patented Sept. 10, 1946

2,407,336

UNITED STATES PATENT OFFICE 2,407,336

METHOD AND MEANS FOR TRANSMITTING INTELLIGENCE

Norman H. Young, Jr., Jackson Heights, N. Y., assignor to Federal Telephone and Radio Corporation, New York, N. Y., a corporation of Delaware Application November 1, 1943, Serial No. 508,617

18 Claims. (Cl. 178—68)

This invention relates to improvements in methods and means for transmitting intelligence, and more particularly to a novel, secret radio communication system of the type in which pulse signals are converted into intelligence-signifying indications.

An object of this invention is to provide a novel method and means for secret radio or other communication of the pulse-transmission type, which utilizes a relatively narrow band and which provides a favorable signal-to-noise ratio and good resistance to interference, such as jamming.

A further object of this invention is to provide a communication system in which predeterminately timed synchronizing pulses and variably timed intelligence-signifying pulses are combined at a receiver to give visual character designations.

Another object of this invention is to provide a communication system in which synchronizing pulses and variably timed intelligence-signifying pulses are stroboscopically combined at a receiver to give visual character readings.

Still another object of this invention is to provide improved visual signal-reproducing means responsive to the combined action of synchronizing pulses and intelligence-signifying pulses variously timed from the synchronizing pulses.

An additional object of this invention is the provision of an improved pulse-generating device for providing one set of continuously spaced synchronizing pulses and another selective set of intelligence-signifying pulses variable in spacing from said synchronizing pulses.

Generally speaking, this invention may be defined as comprising the construction and combinations recited in the annexed claims and illustrated in certain embodiments in the drawings accompanying and forming a part of this application wherein:

Fig. 3 is a chart illustrating the time spacing between certain intelligence-signifying pulses and the synchronizing pulses in accordance with the present invention, together with their relationship to an amplifier blocking pulse.

Fig. 4 is a front plan view of a cathode ray screen illustrating the manner in which signals are reproduced according to a preferred form of this invention;

Fig. 5 is a block circuit diagram of a modified form of a receiving system;

Fig. 5A is a partial enlarged plan view of a modified form of pulse-generating apparatus to be used in connection with the receiving system illustrated in Fig. 5;

Fig. 6 is a transverse view partially in section, of another form of pulse-generating apparatus;

Fig. 7 is a longitudinal plan view, together with a partial circuit diagram of a part of the pulse-generating apparatus illustrated in Fig. 6;

Fig. 8 is a partial front elevation of the pulse-generating apparatus illustrated in Fig. 6;

Fig. 9 is a schematic view of a modified form of signal-reproducing apparatus;

Fig. 10 is a schematic view of another modified form of signal-reproducing apparatus;

Fig. 11 is a schematic view, partially in section, of still another modified form of signal-reproducing apparatus;

Fig. 12 is a front elevation of still another modified form of signal-reproducing apparatus;

Fig. 13 is a longitudinal vertical cross-sectional view taken along the line 13—13 of Fig. 12;

Fig. 14 is a front elevation of another modified form of signal-reproducing apparatus;

Fig. 15 is a front elevation of a rotatable disc forming part of the apparatus illustrated in Fig. 14;

Fig. 16 is a longitudinal cross-sectional view taken along the line 16—16 of Fig. 14;

Fig. 17 is a schematic view of the screen of a cathode ray tube, together with a partial circuit diagram, forming together still another modified form of signal-reproducing apparatus.

Figure 1:
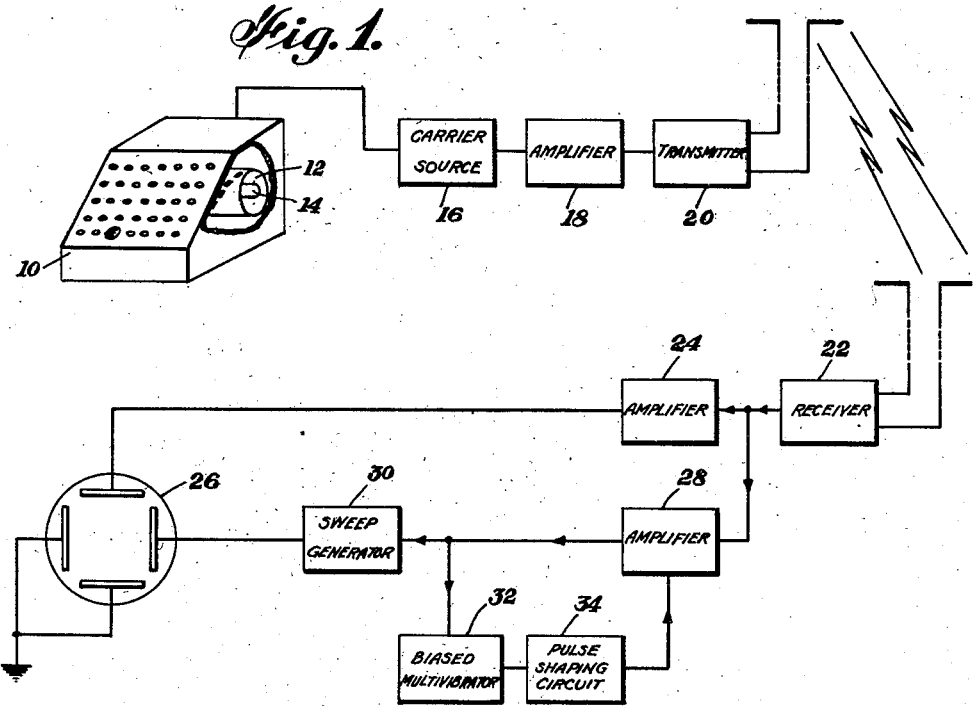
Fig. 1 is a block circuit diagram of a preferred form of communication system in accordance with the present invention.
Figure 2:
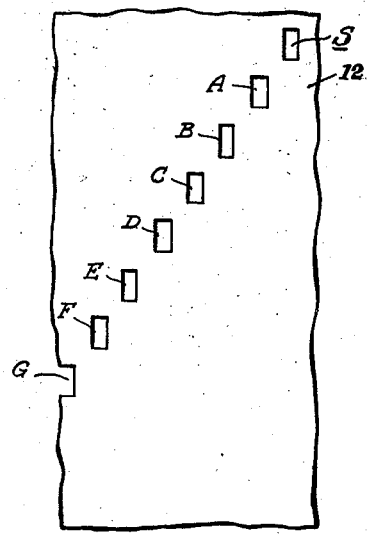
Fig. 2 is an enlarged plan view of a detail of one of the elements of the communication system illustrated in Fig. 1.

In the preferred and simplest form of the invention illustrated in Fig. 1, I propose to use pulse-generating apparatus of generally known form, consisting of a keyboard 10 provided with suitable indicia designating various characters to be selectively produced, which controls the passage of light through a rotatable drum 12 to a light-responsive cell or cells 14. Similar apparatus is already known in the art, for example, in the British patent to Creed and Company, 469,809, and also disclosed in the copending application of Edmond M. Deloraine, S. N. 415,554, filed October 18, 1941. As is more fully explained in the aforesaid patent and copending application, the different keys of the keyboard 10 control the passage of light through various openings on the rotatable drum 12 to initiate action of the light-sensitive device which, in turn, through suitable apparatus is converted into usable pulses. In accordance with the present invention the drum 12, shown in more detail in Fig. 2, may be provided with one or more openings s used to generate a series of regularly timed pulses used for synchronizing purposes. Each opening s is followed by laterally displaced additional openings indicated at A, B, C, D, E, F, G, by way of example, each one of these openings being spaced about the drum 12 a different distance from the synchronizing opening s. In accordance with the present invention no control of light through the opening s is necessary since this will produce synchronizing pulses which are desired at all times that the apparatus is operated. However, suitable means are provided, such as key-controlled shutters, for controlling the passage of light through the remaining openings, at will. It will be seen that if light is permitted to pass through opening A, a pulse will be generated, and timed after the synchronizing pulse formed by the opening s with a predetermined spacing. If the opening B is exposed, another pulse at a different time from the synchronizing pulse will be generated, etc. It will therefore be apparent that according to the present invention various characters are designated by individual pulses which differ in timed relationship with the synchronizing pulse.

The synchronizing pulse and the character-signifying pulse are both used to modulate a suitable carrier source 16, the output from which is amplified as by amplifier 18 and transmitted by transmitter 20.

The receiver 22 will demodulate the signals and at its output will produce both the synchronizing pulses and the timed intelligence-signifying pulses. The receiver output may be amplified as through amplifier 24 and thence connected across the vertical plates of a cathode ray tube 26. The receiver output is passed through another amplifier 28 controlling a sweep generator 30 connected across the horizontal plates of the cathode ray tube. However, in order to properly reproduce a signal or a character in accordance with that transmitted, the sweep generator 30 should be keyed by the synchronizing pulses only. For this purpose the output of the amplifier 28 is also directed to a suitable apparatus such as a biased multivibrator 32 whose output may then be passed through a pulse shaping circuit 34 to block the amplifier 28. The timing of the biased multivibrator 32 is so designated as to block the amplifier 28 upon the reception of a synchronizing pulse, and for a period substantially equal to the period between successive synchronizing pulses. Accordingly, intelligence - signifying pulses also impressed upon the amplifier 28 will not be effective to key the sweep generator, since such pulses all occur during this blocking period.

This operation may be more clearly understood from the diagram shown in Fig. 3. In the first place, the synchronizing pulses caused by the opening s in the pulse-generating device are shown at s' while, if it is assumed that the letter "E" is being transmitted, pulses properly spaced from the synchronizing pulses may appear at E'. Other pulses shown merely by way of example in order to indicate the general difference in timed relationship, are shown at G' and R'. All intelligence-signifying pulses will occur between successive synchronizing pulses s'. When a received synchronizing pulse s' passes through the amplifier 28, it not only initiates the action of the sweep generator 30 but also that of the biased multivibrator 32. The latter can be so designed as to produce a single pulse bb of predetermined length indicated at Fig. 3. As shown in Fig. 3 this pulse can be made to extend from the first of the synchronizing pulses s' substantially up to the next synchronizing pulse, blocking the amplifier 28 for that entire period, and as a result none of the intelligence-signifying pulses will falsely key the sweep generator.

As shown in Fig. 4, the cathode ray tube 26 may be provided on its screen with a suitable scale 36 bearing in spaced relation the characters corresponding to the characters transmitted. When the sweep generator, as initiated by the synchronizing pulse, begins its action to move the cathode ray beam across the screen at a predetermined time, the vertical plates of the cathode ray tube will be energized by an intelligence-signifying pulse whose position is so calibrated with the scale 36 as to point to the character originally transmitted and corresponding to this time spacing. In Fig. 4, by way of example, I have shown the pulse signal E" appearing under the letter "E" on the scale 36, and thus the operator can pick out this letter and similar letter so indicated in accordance with the spacing and timing of the intelligence-signifying pulses. The synchronizing pulse is also applied to the vertical deflecting plates of the cathode ray tube but its position will be removed from the scale 36, being shown for example, at s" in Fig. 4.

In the form of invention described above, it has been assumed that the individual synchronizing pulses have the same parameters as the various intelligence-signifying pulses. It is known, however, that pulses may be distinguished by their parameters and if, for example, the synchronizing pulses are given a different parameter from the intelligence-signifying pulses, separation of such synchronizing pulses at the receiver may be more simply effected than in the system just described. In this case, the receiving system, shown by way of example in Fig. 5, would consist of the receiver 22, amplifier 24 and cathode ray tube 26 in the manner described above, but the output from the receiver 22 would also be passed through a pulse selector 38 prior to the amplifier 28 controlling the sweep generator 30. If, for example, the synchronizing pulses were of greater amplitude than the intelligence-signifying pulses, as might be effected as seen in Fig. 5A, by a drum 12' having a synchronizing opening s1 of greater amplitude than openings A1 and B1, the resulting synchronizing pulses, as will be clear to those skilled in this art, would be of greater amplitude and could be clipped for the purposes of pulse selection. Of course, distinction could be made by reason of pulse width or shape, selecting circuits for which are known to the art. The modification of my system just described may provide simpler receiving apparatus but, on the other hand, slightly complicates the transmitting system.

In Figs. 6, 7 and 8, I have illustrated a novel type of device for the purpose of generating both synchronizing and intelligence-signifying pulses, and which may take the place of the light-sensitive type of pulse-generating device known to the art and used by way of example in the systems shown in Figs. 1 and 5. This device may consist of a small drum or cylinder 40 provided with a plurality of peripherally spaced radial openings in which are slidably mounted stop arms 42 which, therefore, will be angularly displaced about this drum. An arm 44 having an extension 46 is connected through a friction drive 48 to a rotating shaft 50 and will be normally free to rotate within the drum unless one of the various stop arms 42 is depressed, in which case the arm 44 will be held in fixed angular position, as shown in Fig. 6. On the shaft 50 there also appears a rotating switch 52 having a conductive portion 54. An arm 56 holds a brush 60 in contact with the surface of the rotating device 52, and will therefore intermittently contact the conductive portion 54 thereof. A second brush 58 may be in continuous contact with the conductive portion 54. The brush 60 and arm 56 are pivotally mounted as by shaft 62 on the arm 44. It will thus be seen that when none of the stops 42 are depressed, the arm 44 rotates with the rotating switch 52 and there will be no relative movement between the brush 60 and conductive portion 54. However, when the arm 44 is held stationary in various angular positions, the clutch 48 permits relative movement between the arm and the rotating switch 52 and intermittent contact between the brush 60 and the conductive portion 54. Rotating on the shaft 50 is a second rotary switch 64 having a conductive portion 66 making intermittent contact with a fixed brush 68. A second brush 70 is in contact with conductive portion 66. A motor 72 may be used to drive the shaft 50.

If a source of power such as a battery 74 is connected to the brush 68 it will be seen that from the brush 70 will appear, at a frequency determined by the speed of the motor 72, a series of positive pulses having a predetermined time spacing. If the source of power 74 is also connected through a brush 75 to the rotating contact arm 44, no pulses will appear at the brush 58 when the contact arm is free to rotate with the rotary switch 52, but when the contact arm 44 is held in a fixed angular position upon the depression of one of the stops 42, the contacting of the brush 60 with the conductive portion 54 due to the relative rotation at this time will produce a series of pulses bearing a definite time relation to the pulses produced by the device 64, such time relation depending upon the angular position at which the contact arm 44 is stopped. In accordance with the present invention and as previously described, the different intelligence-signifying pulses are characterized by different spacing from these synchronizing pulses and accordingly, if the stops 42 are selectively depressed in accordance with the signal or character desired, the aforedescribed device will produce this selected time variation in the manner desired. Since the pulses produced by this device will be of a relatively long duration and will be relatively coarse, the output therefrom may be shaped through a suitable pulse-shaping device 76 before used to modulate the carrier for transmitting purposes.

In Figs. 6 and 8, I have shown, by way of example, means by which the various stops 42 may be selectively controlled, as by a keyboard. The stop arms 42 are preferably biased to an outward position by any suitable means such as springs, while cam members 78 are utilized to press the various stops inwardly against the action of such retracting springs. The cams 78 are mounted on individual rocker shafts 79 which, in turn, may be rotated by longitudinally extending rods 80, acting through individual rocker arms 81. The longitudinally extending rods 80 are moved upwardly upon a depression of keys 82 of the keyboard which, as is common in the art, will bear suitable identifying indicia. Upward movement of the rods 80 rotates the individual shafts 79 in a direction to press the selected cams 78 against the individual stop members 42. The assembly may be mounted in a suitable frame, the rocker shafts 79 being pivotally supported at either end by rings 84 and 86 supported within a suitable mounting frame 88. As will be seen in Fig. 8, in which some of the connections between keys and rocker shafts have been illustrated by way of illustration, while others have been omitted to prevent complicating and confusing the drawing, the vertical rods 80 with the individual rocker arms will be longitudinally spaced from one another comparatively to the positions on the controlling keys of the keyboard. In these figures I have indicated further, by way of example, the depression of the key 82' corresponding to the letter "E," resulting in an upward movement of the rod 80' and a clockwise rotation of the rocker arm 81' and shaft 79', with a resulting downward movement of the cam 78' against the now depressed stop member 42'.

While in Figs. 7 and 8 I have illustrated for the purpose of showing an operable example, various links, cams, rods and levers for suitably operating the stop arms 42 from a keyboard, it is contemplated that other equivalent means for this purpose may be used.

In Figs. 9 to 17 inclusive, I have illustrated by way of example, various modified forms of stroboscopic signal-reproducing apparatus which is usable with the systems previously described, utilizing synchronizing pulses and various intelligence-signifying pulses characterized by a different spacing from the synchronizing pulses. In Fig. 9, for example, in place of the cathode ray tube reproducing apparatus shown in Figs. 1 and 4, characters to be reproduced may be formed on a disc 100 rotated by a motor 102 supplied with synchronous power in accordance with the synchronizing pulses, such as from an oscillator 104 which may be keyed by the synchronizing pulses. In front of the disc 100 is placed a mask 112 having an opening 114 aligned, for example, with a set of characters 106. A light source 116, such as a neon light, is energized by the intelligence-signifying pulses. It will be clear to those skilled in this art that since the disc 100 rotates synchronously in accordance with the synchronizing pulses, if the characters 106 are properly spaced on this disc the character which appears in the opening 114 of the mask 112 will depend upon the timing of the light 116, as determined by the timing of the particular intelligence-signifying pulse being transmitted and received. If it is desired to use the system for the sending of code signals, other lines of characters such as indicated at 108 and 110 may be placed on the disc 100, and the mask 112 shifted in front of the appropriate line, depending upon the code in use. This forms a very simple means for using various codes for transmission purposes, at will.

A similar scheme is illustrated in Fig. 10 in which case, however, the characters are formed about a drum 118, in front of which is positioned a slidable mask 120 having a suitable opening 122. Different lines of characters indicated at 124, 126 and 128 can be aligned with the opening 122, depending upon the code to be used. A light source (not shown) will be controlled by the intelligence-signifying pulses, while the motor 102 will be rotating synchronously with the synchronizing pulses.

A variation of this idea is illustrated in Fig. 11, involving the rotation of extremely light parts.

In this case, the motor 102 synchronously drives a mirror 130 mounted at an angle of 45° within a drum or cylinder 132, about whose inside surface is formed a ring of characters 134. As the mirror 130 rotates, the characters will appear through a suitable lens or eye piece 142, the character visible varying as the stroboscopic light illuminating such characters is timed by the intelligence-signifying pulses operating the lamp 116. Again, different combinations can be utilized in this system by providing the inside of the cylinder with additional rows of characters, one of which is indicated at 136, and utilizing longitudinally slidable masks 138 and 140.

While the reproducing apparatus illustrated in Figs. 9, 10 and 11 have the advantage that the character to be read always appears at one point to the observer, they would have the disadvantage that if the apparatus, while maintaining approximate synchronism, is subject to small phase variations due to noise or other causes, the letter or character will appear blurred. In the form of reproducing apparatus indicated in Figs. 12 and 13, however, the position of indication will change for each character, but in no event will a character to be read appear blurred. In these figures, for example, I have indicated a rotatable opaque disc 144 provided with an arrow 146 in the form of a light opening. This disc will be synchronously rotated by the motor in accordance with the synchronizing pulses. Outside of the disc 144 is a ring 148 bearing the individual characters 150. The ring 148 may be opaque while the characters 150 can be light-conducting. If this apparatus is lighted by the lamp 116 in accordance with the intelligence-signifying pulses, the arrow 146 together with the characters, will be lighted when the arrow is opposite a character whose spacing is determined by the spacing of the received intelligence-signifying pulse. Thus, as the disc 144 and the arrow 146 rotate, the arrow will appear to stop at different letters in accordance with the received signals.

A variation of this same thought is illustrated in Figs. 14, 15, and 16. In this case I utilize a rotatable opaque mask 152 having a side opening 154 and behind this is provided a second stationary disc 156 bearing the individual characters 158. The disc 152 is rotated by the motor in accordance with the synchronizing pulses, while a light source 116 actuated by the intelligence-signifying pulses will illuminate the device when the opening 154 is opposite the character as determined by the spacing of these intelligence-signifying pulses.

An adoption of the stroboscopic reproducing means to a cathode ray tube is illustrated by way of example in Fig. 17. In this case the cathode ray tube is provided with a grid 162 as well as the usual vertical and horizontal deflecting plates. A circular scale 164 bearing the desired characters is placed on the screen of the tube or in front of the same. The cathode ray beam is deflected in a rotating fashion by a two-phase generator 166 of some suitable well-known type, which is keyed by the incoming synchronizing pulses. This beam, however, will remain "dark" until the tube is illuminated by actuation of the grid 162 by the intelligence-signifying pulses. By a proper spacing of the characters on the scale 164 with the spacing of the intelligence-signifying pulses from the synchronizing pulses, the beam will then appear opposite the proper character corresponding to that transmitted.

The system together with the modifications thereof described above are admirably adapted to fulfill the objects primarily stated. While the timing of the synchronizing pulses and the following intelligence-signifying pulses can be varied in accordance with the desired apparatus and within limits which will be clear to those skilled in this art, I have found that the system is suitable for the conversion into letters for visual operation at a speed of approximately one character per second. Each character may be repeated twenty times in that second, and the timing at the receiver should be accurate within plus or minus 50 microseconds. The time of one revolution of the transmitting and receiving mechanism would be approximately 50 milliseconds. A suitable time rise of each pulse might be about 25 microseconds with a total pulse duration of 50–75 microseconds. With conventional methods of pulse transmission this would result in a ratio of peak-to-average power of about 2,000. The highest frequencies involved would probably not exceed 25 kilocycles, resulting in a band width of approximately 50 kilocycles.

Various changes coming within the scope of those skilled in this art are contemplated for carrying out the principles of the present invention. For example, in order to more clearly distinguish at the receiver between synchronizing and intelligence-signifying pulses, the two sets of pulses could be transmitted at different frequencies as disclosed, for example in my co-pending application S. N. 457,407, filed September 5, 1942, or the two may be distinguished by utilizing one as an amplitude modulator and another as a frequency modulator, with comparable discriminating apparatus at the receiver. Both of these methods would avoid all possibility of error due to keying of the synchronizing apparatus by the intelligence-signifying pulses, which might occur for a brief period, although this condition would soon automatically correct itself due to the regularity of the synchronizing pulses and the irregularity between different sets of intelligence-signifying pulses. Obviously the system is applicable to direct or carrier wire transmission as well as radio transmission. Accordingly, while I have described above the principles of my invention in connection with certain specific apparatus and particular modifications thereof, it is to be clearly understood that this description is made only by way of example and not as a limitation on the scope of my invention as set forth in the objects and the accompanying claims.

I claim:

1. Intelligence transmission system comprising, in combination, means generating a series of synchronizing pulses of a predetermined frequency, means generating a series of sets of intelligence-signifying pulses of the same frequency as said synchronizing pulses, the pulses for each intelligence-signifying character occurring between successive synchronizing pulses, and the pulses of each set being distinguished from the pulses of another set by a different time spacing from the synchronizing pulses, means for sequentially selecting the different sets of desired intelligence-signifying pulses, means transmitting both synchronizing and intelligence-signifying pulses, a receiver for both series of pulses, means connected to said receiver distinguishing the synchronizing pulses from the two received series of pulses in response to any received first synchronizing pulse, means at said receiver carrying a set of indicia corresponding to the intelligence characterized by each set of intelligence-signifying pulses, and means responsive to the combined action of said synchronizing pulses and the spacing between the synchronizing pulses and the intelligence-signifying pulses for designating the proper indicia in accordance with the transmitted intelligence-signifying pulses.

2. The method of intelligence-transmission, which includes the steps of generating a series of pulses of predetermined repetition frequency, generating a second series of sets of pulses of the same frequency, each pulse of said second series occurring between successive pulses of the first series and differing from the pulses of the other sets by a different time displacement from the pulses of the first series, whereby each pulse of each set of said second series may represent a character to be transmitted, receiving both series of pulses, and, beginning with any first pulse of the received first series of pulses combining said first series with the individually differently spaced pulses of the second series to reproduce the transmitted intelligence.

3. The method according to claim 2, which further includes the step of generating the two series of pulses with like individual pulse parameters.

4. The combination according to claim 1, in which said pulse-distinguishing means includes an amplifier connected to the output of said receiver, and means responsive to the reception of a synchronizing pulse for blocking said amplifier for a period slightly less than the time interval between synchronizing pulses, whereby the output from said amplifier will consist of synchronizing pulses only.

5. The combination according to claim 1, in which both pulse-generating means are dimensioned to produce individual pulses having substantially identical parameters.

6. The combination according to claim 1, in which the individual pulses produced by the intelligence-signifying pulse-generating means have substantially identical parameters, and in which the synchronizing pulse-generating means is dimensioned to produce individual pulses having a different parameter from the intelligence-signifying pulses.

7. The method according to claim 2, which further includes the steps of generating all of the pulses of the second series of like individual pulse parameters and the pulses of the first series all with like parameters differing from the pulses of the second series.

8. The combination according to claim 1, in which the first-named pulse-generating means includes a rotary switch device having a rotating contacting surface provided with a predetermined conductive portion, and a fixed contactor engageable with said surface and contacting said conductive portion at predetermined intervals as the switch device rotates, and in which the second named pulse-generating means includes a second rotary switch device having a rotating contacting surface provided with a predetermined conductive portion, a contactor urged against said surface, frictional means normally rotating said contactor with said second rotary switch device, and controllable means holding said contactor in various fixed angular positions depending on the intelligence to be transmitted, whereby the time relationship between the contacting of the second contactor with the second rotary switch device, may be varied relatively to the contacting of the first fixed contactor with the first rotary switch device, a source of power, means connecting said source of power serially through each of the two rotary switch devices and its corresponding contactor with said transmitting means, and means rotating said rotary switch devices.

9. The combination according to claim 1, in which the first-named pulse-generating means includes a rotary switch device having a rotating contacting surface provided with a predetermined conductive portion, and a fixed contactor engageable with said surface and contacting said conductive portion at predetermined intervals as the switch device rotates, and in which the second-named pulse-generating means includes a second rotary switch device having a rotating contacting surface provided with a predetermined conductive portion, a contactor urged against said surface, frictional means normally rotating said contactor with said second rotary switch device, a ring surrounding the contactor of said second rotary switch device, a plurality of radially directed stop arms slidably mounted about the periphery of said ring, means normally urging said stop arms outwardly, and selective means for moving said stop arms inwardly in the path of the second contactor to hold it in the selective fixed angular position, whereby the time relationship between the contacting of the second contactor with the second rotary switch device may be varied relatively to the contacting of the first fixed contactor with the first rotary switch device, a source of power, means connecting said source of power serially through each of the two rotary switch devices and its corresponding contactor with said transmitting means, and means rotating said rotary switch devices.

10. The method according to claim 2, in which said last step includes rotating a character-designating device synchronously with the one series of pulses and illuminating a series of intelligence-signifying characters in time with the pulses of the second series.

11. The combination according to claim 1, in which said last means comprises a rotatable indicia-indicating device, means for rotating said device synchronously with said synchronous pulses, and means actuated by said intelligence-signifying pulses for illuminating said indicia.

12. Intelligence transmission system comprising, in combination, means generating a series of synchronizing pulses of a constant predetermined spacing and frequency, means generating a series of sets of intelligence-signifying pulses of the same frequency as said synchronizing pulses, the pulses for each intelligence-signifying character occurring between successive synchronizing pulses, and the pulses of each set being distinguished from the pulses of another set by a different time spacing from the synchronizing pulses, means for sequentially selecting the different sets of desired intelligence-signifying pulses, means transmitting both synchronizing and intelligence-signifying pulses, a receiver for both series of pulses, means connected to said receiver and forming a branch thereof for blocking all but the synchronizing pulses from the two received series of pulses in said branch in response to any received first synchronizing pulse, a cathode ray tube at said receiver, means carrying a set of indicia corresponding to the intelligence characterized by the sets of intelligence-signifying pulses, positioned in viewable juxtaposition to the screen of the cathode ray tube, and means responsive to the combined action of said synchronizing pulses and the intelligence-signifying pulses actuating said cathode ray tube for positioning the cathode ray beams to designate the proper indicia in accordance with the transmitted intelligence-signifying pulses.

13. The combination according to claim 12, in which said pulse distinguishing means includes an amplifier connected to said receiver, and means responsive to the reception of any first synchronizing pulse for blocking said amplifier for a period slightly less than the time interval between synchronizing pulses, whereby the output from said amplifier will consist of synchronizing pulses only.

14. Intelligence transmission system comprising, in combination, means generating a series of synchronizing pulses of a constant predetermined spacing and frequency, means generating series of sets of intelligence-signifying pulses of the same frequency as said synchronizing pulses, the pulses for each intelligence-signifying character occurring between successive synchronizing pulses, and the pulses of each set being distinguished from the pulses of another set by a different time spacing from the synchronizing pulses, means for sequentially selecting the different sets of desired intelligence-signifying pulses, means transmitting both synchronizing and intelligence-signifying pulses, a receiver for both series of pulses, means connected to said receiver and forming a branch thereof for blocking all but the synchronizing pulses from the two received series of pulses in said branch in response to any received first synchronizing pulse, a cathode ray tube having two pairs of deflecting plates at an angle to one another, means carrying a set of indicia corresponding to the intelligence-signifying pulses, positioned in viewable juxtaposition to the screen of the cathode ray tube, means energizing one pair of deflecting plates from the receiver output, and means energizing the other pair of deflecting plates by the synchronized pulses only.

15. The combination according to claim 1, in which said indicia-carrying means comprises a rotatable device, and in which said last-named means includes a motor driving said device and controlled by the synchronizing pulses, and a light actuated by the receiver output for illuminating said indicia.

16. The combination according to claim 14, in which said pulse-distinguishing means includes an amplifier connected to said receiver, and means responsive to the reception of any first synchronizing pulse for blocking said amplifier for a period slightly less than the time interval between synchronizing pulses, whereby the output from said amplifier will consist of synchronizing pulses only.

17. Intelligence transmission system comprising, in combination, means generating a series of synchronizing pulses of a constant predetermined spacing and frequency, means generating a series of sets of intelligence-signifying pulses of the same frequency as said synchronizing pulses, the pulses for each intelligence-signifying character occurring between successive synchronizing pulses, and the pulses of each set being distinguished from the pulses of another set by a different time spacing from the synchronizing pulses, means for sequentially selecting the different sets of desired intelligence-signifying pulses, means transmitting both synchronizing and intelligence-signifying pulses, a receiver for both series of pulses, means connected to said receiver and forming a branch thereof for blocking all but the synchronizing pulses from the two received series of pulses in said branch, a cathode ray tube having two pairs of deflecting plates mounted at an angle to one another and a grid, means about the periphery of the cathode ray tube carrying a set of indicia corresponding to the intelligence characterized by the set of intelligence-signifying pulses, means energizing said grid by the received pulses, a two-phased generator connected across the pairs of deflecting plates, and means controlling said two-phased generator by the synchronizing pulses.

18. The combination according to claim 1, in which said indicia-carrying means comprises a hollow cylinder about whose inner surface said indicia are aligned in the form of a ring, and in which the last-named means includes a motor controlled by the synchronizing pulses, an angularly mounted mirror rotated by said motor and positioned centrally inside of said cylinder in alignment with the indicia ring, and a light actuated by the receiver output for illuminating said indicia.

NORMAN H. YOUNG, Jr.